(12) United States Patent
Serbetli (10) Patent No.: US 9,031,170 B2
(45) Date of Patent: May 12, 2015

(54) CHANNEL FREQUENCY RESPONSE ESTIMATOR FOR A WIRELESS RF CHANNEL

(71) Applicant: NXP B.V., Eindhoven (NL)

(72) Inventor: Semih Serbetli, Eindhoven (NL)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 13/971,419

(22) Filed: Aug. 20, 2013

(65) Prior Publication Data

US 2014/0079109 A1 Mar. 20, 2014

(30) Foreign Application Priority Data

Sep. 20, 2012 (EP) .................................... 12185206

(51) Int. Cl.
 *H04L 25/02* (2006.01)
 *H04L 25/06* (2006.01)
 *H04L 27/233* (2006.01)
 *H04L 1/20* (2006.01)

(52) U.S. Cl.
 CPC .......... *H04L 25/022* (2013.01); *H04L 25/0202* (2013.01); *H04L 25/067* (2013.01); *H04L 27/2331* (2013.01)

(58) Field of Classification Search
 CPC . H04L 25/0202; H04L 25/022; H04L 25/025; H04L 25/067; H04L 27/2331; H04L 25/0238
 USPC .......... 375/340, 316, 354; 455/506, 504, 501, 455/500, 297, 296
 See application file for complete search history.

(56) References Cited

U.S. PATENT DOCUMENTS

| | | | | |
|---|---|---|---|---|
| 5,263,033 A | * | 11/1993 | Seshadri | 714/792 |
| 5,619,524 A | * | 4/1997 | Ling et al. | 375/130 |
| 2001/0055271 A1 | * | 12/2001 | Okada et al. | 370/206 |
| 2003/0187928 A1 | * | 10/2003 | MacLeod et al. | 709/204 |
| 2005/0170783 A1 | * | 8/2005 | Krishnan et al. | 455/67.11 |
| 2007/0211827 A1 | | 9/2007 | Baggen et al. | |
| 2009/0232230 A1 | * | 9/2009 | Hung et al. | 375/260 |
| 2010/0166126 A1 | * | 7/2010 | Matsumura et al. | 375/350 |

(Continued)

OTHER PUBLICATIONS

Gorokhov, A. et al. "Robust OFDM Receivers 1-13 for Dispersive Time-Varying Channels: A Equalization and Channel Acquisition", IEEE Trans. on Communications, vol. 52, No. 4, pp. 572-583 (Apr. 2004).

(Continued)

*Primary Examiner* — Chieh M Fan
*Assistant Examiner* — Michelle M Koeth (57) ABSTRACT

A channel frequency response estimator for estimating the channel frequency response of a wireless RF channel having a time or frequency varying channel frequency response is disclosed. The channel frequency response estimator includes a wireless receiver. An ambiguous channel frequency response estimator is also included and configured to establish multiple channel frequency response estimate candidates for the channel frequency response of the channel. An ambiguity resolver is configured to select a channel frequency response estimate from the multiple channel frequency response estimate candidates that maximizes a goodness of fit of the selected first channel frequency response estimate, and at least two further channel frequency response estimates to a channel model. The channel model models the time or frequency dependent variance of the channel frequency response.

12 Claims, 4 Drawing Sheets

(56) References Cited

U.S. PATENT DOCUMENTS

2011/0122975 A1* 5/2011 Umeda et al. ................ 375/319
2011/0158361 A1* 6/2011 Dent et al. .................... 375/347
2014/0079109 A1   3/2014 Serbetli

OTHER PUBLICATIONS

Van Houtum, W. J. et al. "Joint and Iterative Detection and Decoding of Differentially Encoded COFDM Systems", IEEE 17$^{th}$ Int'l. Conf. on Telecommunications, pp. 36-43 (Apr. 2010).

Extended European Search Report for EP Patent Appln. No. 12185206.5 (Feb. 11, 2013).

D. Divsalar and M. Simon, "Multiple-symbol differential detection of MPSK", IEEE Tran. on Comm., vol. 38, No. 3, pp. 300-308, Mar. 1990.

K. M. Mackenthun, Jr., "A Fast algorithm for Mulitple-Symbol Differential Detection of MPSK", IEEE Tran. on Comm., vol. 42, pp. 1471-1474, Feb./Mar./Apr. 1994.

M. Peleg et al., "Iterative decoding for coded noncoherent MPSK communications over phase-noisy AWGN channel", IEEE Tran. on Comm., vol. 147, No. 2, pp. 87-95, Apr. 2000. Abstract Only.

R.-R. Chen et al., "Joint noncoherent demodulation and decoding for the block fading channel: a practical framework for approaching Shannon capacity", IEEE Tran. on Comm., vol. 51, No. 10, Oct. 2003.

W. J. van Houtum et al., "Two-Dimensional Iterative Processing for DAB Receivers Based on Trellis-Decomposition", Journal of Electrical and Computer Engineering, vol. 2012.

L. Bahl et al., "Optimal decoding of linear codes for minimizing symbol error rate (corresp.)", IEEE Tran. on Info. Theory, vol. 20, No. 2, pp. 284-287, Mar. 1974.

J. Hagenauer et al., "A Viterbi algorithm with soft-decision outputs and its applications", in proc. IEEE Globecom, pp. 47.11-47.17, Dallas, TX, Nov. 1989.

B. Muquet et al., "Subspace-based blind and semi-blind channel estimation for OFDM systems", IEEE Tran. on Signal Processing, vol. 5, No. 7, pp. 1699-1712, Jul. 2002.

S. Zhou et al., "Finite-alphabet based channel estimation for OFDM and related multicarrier systems", IEEE Tran. on Communications, vol. 49, No. 8, pp. 1402-1414, Aug. 2001.

S. Serbetli, "Blind Channel Estimation Assisted Coherent Demodulation of DPSK Modulated OFDM Systems" IEEE Globecom Conference presented Dec. 9, 2014.

* cited by examiner

CHANNEL FREQUENCY RESPONSE ESTIMATOR FOR A WIRELESS RF CHANNEL

CROSS-REFERENCE TO RELATED APPLICATIONS

This application claims the priority under 35 U.S.C. §119 of European patent application no. 12185206.5, filed on Sep. 20, 2012, the contents of which are incorporated by reference herein.

FIELD OF THE INVENTION

The invention relates to a channel frequency response estimator for estimating the channel frequency response of a wireless RF channel having a time-varying channel frequency response, the channel frequency response estimator comprising a wireless receiver for receiving a wireless RF signal and obtaining therefrom a stream of received signals corresponding to a stream of information encoding symbols, the stream of information encoding symbols being encoded into the wireless RF signal by modulating at least the phase of a carrier signal.

BACKGROUND OF THE INVENTION

Digital data communication over a wireless channel is used in a variety of applications. One way to encode digital information in an RF signal is by manipulating the phase and/or magnitude of the signal in dependence on the digital information which is to be transmitted. At the receiving end the magnitude and/or phase changes are detected and the digital information is reconstructed. Transmitting data by encoding the information in phase is referred to as phase-shift keying (PSK). For example, it conveys data by modulating the phase of a reference signal (the carrier wave).

Phase-shift keying (PSK) is used in a variety of applications such as: communication to and from RFID tags, wireless LAN, including Wi-Fi, DAB, DAB+, and Bluetooth. PSK may use a finite number of phases to represent digital data, also called symbols. Each phase may be assigned a unique pattern of binary digits.

At the transmitter side, a modulator maps digital information to a sequence of symbols which in turn is encoded in the phase changes of a signal which is to be transmitted using an antenna. At the receiver end, a demodulator determines the phase of the received signal and maps it back to the symbol it represents, thus recovering the original digital information. Typically, the demodulator is designed specifically for the symbol-set used by the modulator.

The wireless channel interacts with the transmitted signal through the so called channel frequency response. The received signal equals the transmitted signal multiplied with the channel frequency response plus additive white Gaussian noise, that is: $y_l = H_l s_l + n_l$. In this formula: $y_l$ represents the l'th received signal, $H_l$ the frequency response, $s_l$ the transmitted symbol, and $n_l$ the noise. Note that the entities are modeled as complex numbers, either representing a combination of an In-phase and quadrature component, or as a combination of magnitude and phase. One representation may be converted into the other as convenient.

To complicated matters further, the channel frequency response is not constant, in particular if the receiver is mobile, e.g., a car, the channel frequency response will change considerably with time.

Two principal solutions have been proposed to the problem that the transmitted symbols have been multiplied with an unknown channel frequency response before they received signals.

First: In so-called coherent reception schemes coherently modulated symbols are used with pre-determined training sequences or 'pilots' in the transmitted signal. Coherent demodulation requires channel state information which can be obtained by comparing the received pilots with knowledge about the pilots as they are transmitted.

Second: Differential modulation is a special modulation technique which can be demodulated with a non-coherent receiver, i.e., a conventional differential demodulator can demodulate the symbols without using any channel estimation or equalization processes at the receiver simplifying the receiver structure. Due to this property, differential modulation has been chosen as the modulation scheme in several wireless standards, e.g., DAB, T-DMB etc.

Although differential modulation allows simpler receivers, the method is not without its problems: The first drawback of differential modulation and demodulation is that it assumes the channel remains almost static during the two symbols where differential modulation is used. However, this assumption does not hold true in mobile reception where differential modulation is applied in time direction, e.g., over successive OFDM symbols in DAB family of standards or frequency selective reception where differential modulation is applied in frequency direction, e.g., over successive subcarriers of an OFDM symbol. As a result of this, the performance degrades with increased mobility and/or frequency selectivity.

Another drawback of differential demodulation is due to the encoding of the data in two successive symbols. This causes two noise sources affecting the demodulation process even if the channel is static, leading to approximately 3 dB performance loss.

SUMMARY OF THE INVENTION

It would be advantageous to have an improved channel frequency response estimator. Such an improved channel frequency response estimator could be used in modulation schemes with and without pilots. For example, in a scheme with pilots, e.g., DVB-T or IEEE 802.11P etc., the channel frequency response estimator may be used to track changes in the channel frequency response between pilots. Especially at higher mobility, the number of pilot symbols is often too low to consistently track the channel. The channel frequency response estimator may also be used in a system without pilots. The inventors had the insight that reception of a differentially modulated scheme may be considerably improved by, contrary to the underlying principle of differential modulation, the channel frequency response is estimated from the information carrying received signals, and the channel frequency response is used to coherently decode the received signals. Apart from the noise reduction, this will also improve the precision of soft decision information for use in a subsequent soft-decision FEC decoder, e.g. a Viterbi decoder.

Estimating the channel frequency response not from pilots but from information carrying received signals is also referred to as blind channel frequency response estimation, or blind channel tracking.

A channel frequency response estimator for estimating the channel frequency response of a wireless RF channel having a time-varying channel frequency response is provided. The channel frequency response estimator comprises a wireless receiver, an ambiguous channel frequency response estimator and an ambiguity resolver.

The wireless receiver is configured to receive a wireless RF signal and obtaining therefrom a stream of received signals corresponding to a stream of information encoding symbols. The stream of information encoding symbols is encoded into the wireless RF signal by modulating at least the phase of a carrier signal.

The ambiguous channel frequency response estimator is configured to establish, from at least a first received signal of the stream of received signals, multiple channel frequency response estimate candidates for the channel frequency response of the channel during the transmission of the first received signal over the channel.

The ambiguity resolver is configured to select a channel frequency response estimate from the multiple channel frequency response estimate candidates that maximizes a goodness of fit of the selected first channel frequency response estimate, and at least two further channel frequency response estimates to a channel model. The channel model models the time-dependent variance of the channel frequency response. The at least two further channel frequency response estimates are estimates for the channel frequency response of the channel during transmission of at least two further received signals of the stream of received signals adjacent in time to the first received signal.

The channel frequency response estimator makes use of the fact that the received signals correspond to a constellation point. Although the transmitted constellation point is not known at the receiver side, there are only a finite number of constellation points. This implies that ambiguous channel frequency response estimator may establish from a first received signal of the stream of received signals a number of estimates by comparing the received signal to all possible constellation points. For example, suppose the RF signal is modulated using QPSK; QPSK uses four constellation points, equispaced around the unit circle of a constellation diagram. This means that given a received signal there are four possible channel frequency responses possible. Note however, that it is possible to estimate the channel magnitude part of the channel frequency response separate from the channel phase offset part.

Estimating a channel frequency response from a received signal that is determined both by an unknown constellation point and an unknown channel frequency response is inherently ambiguous and thus gives rise to multiple possibilities. This ambiguity is resolved by the ambiguity resolver. The channel frequency response cannot change in any random way, but is subject to such factors as the motion of the receiver, and the particular multipath nature of the channel. It is possible to model these changes, so that one may decide if any particular sequence of channel frequency responses is likely to actually occur or not. In a less advanced channel frequency response estimator one could select the channel frequency response estimate candidate that is closest to an adjacent channel frequency response (adjacent in time, e.g., one symbol period earlier or later). The inventors have realized however that such an approach will not work well with a mobile receiver, e.g., installed in car. In a mobile receiver, the channel frequency response is expected to vary, selecting against change in the channel frequency response will often result in selecting a wrong estimate.

The ambiguity resolver improves upon this by taking at least three channel frequency responses for three adjacent, e.g. subsequent, symbol periods. Accordingly, change in the channel frequency response is taken into account. For example, one may verify that the amount of change from a first channel frequency response to a second channel frequency response is about equal to the amount of change from the second channel frequency response to a third channel frequency response.

The wireless RF signal that is received contains digital information. The digital information was encoded into a stream of information encoding symbols selected from a set of constellation points; each constellation point representing a magnitude and phase, the carrier signal is modulated in accordance with the stream of symbols.

The channel tracking algorithm assisted demodulation method is especially useful for differential modulation. It is motivated by three facts: 1—One only needs to estimate the channel magnitude and phase offset between the channel and constellation point to apply coherent demodulation methods to differential modulation, 2—The receiver has quite a few observations through correlated channels either in frequency or time domain to estimate the channel parameters required, and 3—The channel changes can be modelled in a certain structure to solve any ambiguities in the channel parameter estimation. Exploiting these three facts, we propose to use a three stepped demodulation scheme. In the first stage, the required parameters of the channel will be estimated, blindly if necessary, and in the second stage we solve any ambiguities in the estimated channel parameters, and finally in third stage, we use this valuable information in coherent demodulation.

The channel frequency response of the wireless RF channel may have a frequency varying channel frequency response instead or in addition to a time varying response. In this case the same principles apply. Using a model of frequency response varying across frequency the ambiguity in the estimates may be resolved.

In an embodiment, the ambiguous channel frequency response estimator is configured to establish at least two further multiple channel frequency response estimate candidates for the channel frequency response of the channel during the transmission of the at least two further channel frequency response estimates respectively.

By establishing multiple channel frequency response estimate candidates for three received signals, i.e., the first received signal and the further two received signals, the channel frequency response estimates may be obtained without the use of any pilot signal. Interestingly, if an M-PSK modulation is used, i.e., M equispaced constellation points of constant magnitude, then the optimum selected over the three established multiples is not unique, however, each optimum has the same phase difference. Accordingly, if M-PSK is used without pilots, i.e. differential modulation (M-DPSK) is used, then all optima give the same differential demodulation result.

In an embodiment, at least one of the at least two further received signals correspond to transmitted pilot signals. The channel frequency response estimator may also be used to track the channel frequency response between pilot signals. When using pilots the optima are usually unique.

In an embodiment, the channel model is obtained by a truncated Taylor series approximation, in particular the channel model may be a linear model. There is no need to perform the fitting itself to obtain the goodness of fit. Instead a costs function, or fitter error function may be designed to indicate how difficult it is to fit the model to the data. The goodness of fit is maximized if the fitting error function is minimized. For example, in an embodiment, the fitting error function represents $|\hat{H}_1 - 2\hat{H}_0 + \hat{H}_{-1}|^2$, wherein $\hat{H}_1$, $\hat{H}_0$, $\hat{H}_{-1}$ represent the selected first channel frequency response estimate, and the at least two further channel frequency response estimates. The estimates $\hat{H}_1$, $\hat{H}_0$, $\hat{H}_{-1}$ corresponds to received signals that were received in order.

The closer the channel frequency response estimates are to collinear and equally spaced, the lower the fitting error function is. Other fitting error functions having this property could also be used. In this case, the fitting error function is zero if the channel frequency response estimates are collinear and equally spaced, i.e. are approximated by a linear function. Note that, one could take more channel frequency responses into account than three. Furthermore one could take higher order Taylor approximations. For example, a fitting error function may be selected that is lower if the channel frequency responses approach a quadratic function, etc.

A channel frequency response has two components, a channel magnitude and a channel offset, which represent the change caused by the channel in signal magnitude and phase respectively. A channel frequency response is typically represented as a complex number, having the channel magnitude as magnitude and the channel phase offset as phase. A complex number, such as a channel frequency response estimate, may be represented in an implementation in various ways. First of all, magnitude/phase representation may be interchanged with in-phase/quadrature representation. Furthermore, they may be represented as a pair of digital numbers, say as 16 bit numbers. But these numbers may also be represented as two analog signals.

To establish channel frequency response estimates one may estimate separately the channel magnitude and the channel phase offset. In fact, in the absence of pilot this may be preferable, since these two components are best estimated with their own algorithms.

The channel magnitude may be estimated from the magnitude from a received signal. If the modulation scheme does not use magnitude modulation, but only phase modulation, say M-PSK, such as QPSK, that is if the information encoding symbols all have the same magnitude, then the channel magnitude may be obtained from the magnitude of a received signal. The channel magnitude may also be obtained by averaging over a few received signals. Especially advantageous is to average over the multiple received signals at different subcarriers of the same frequency-division multiplexing symbol, e.g., an OFDM symbol. The latter has the advantage that these signals were sent at the same time and thus went through the same channel. The magnitude of received signals is compared to the known magnitude of sent symbols.

If magnitude modulation is used in addition to phase modulation, one may take the average of the magnitudes of multiple received signals, again the multiple received signals may be taken from at different, preferably adjacent, symbol periods, or the multiple signals may be taken from different subcarriers of the same frequency multiplex symbol. In this case the sent magnitude is unknown, however the average over multiple symbols is expected to be the average of the magnitudes of the information symbols.

In either situation, it is noted that typically for the channel magnitude a single estimate is obtained. However, one could establish a list of channel magnitude estimate candidates as well. For example, one may do the following: a channel magnitude estimate may be obtained by comparing the magnitude of a received signal with the magnitudes of the constellation points from which the information encoding symbols in the stream of information encoding symbols were selected. For example, this may be applied in an amplitude and phase-shift keying (APSK) digital modulation scheme that conveys data by changing, or modulating, both the amplitude and the phase of a reference signal (the carrier wave), e.g. 16 apsk.

For the channel offset estimate multiple candidates are established by comparing the phase of the first received signal with the phases of the constellation points from which the information encoding symbols in the stream of information encoding symbols were selected. At the receiver side it is unknown which constellation point was used during transmission. Because of the channel distortion, any phase at the transmission side may result in any phase at the receiving side. However, it is know that a constellation point was used. So by comparing the phase of a received signal with the phase of all constellation points, candidates for the channel phase offset may be established. They may be put in a list, or they may be generated as needed, etc.

The candidates for the channel phase offset estimate may be combined with the estimate for the magnitude (or magnitudes if there are also multiple estimates for the magnitudes) to produce multiple candidates for a channel frequency response estimate.

This ambiguity in the channel frequency response estimate needs resolving, which may be done by fitting to a model. From one or two channel frequency estimates one cannot, usually, see if they are likely produced by a physically likely channel, especially for moving receivers. A channel model indicates how likely a given sequence of channel frequency response estimates is. For example, a linear channel model may verify if the differences between subsequent channel response estimates are equal; if they are not the discrepancy between the model and the actual sequence is represented in a number. With a goodness of fit number, a higher number indicates a better match; with a fitting error number a lower number indicates a better match.

A moving receiver will induce more channel changes, so it will not be possible, to simply select, say, the channel phase offset estimate which is closest to the previous channel phase offset. However, once three or more channel frequency response estimates are available it is possible to discard those channel frequency response estimates that are unlikely to correspond to a real channel, i.e., by fitting to a channel model.

It is furthermore noted, that an advantage of this method is that it takes into account the channel magnitude estimates to see if the channel frequency response estimates may be fitted to a model. Although for many modulation schemes (e.g. constant magnitude modulation), the ambiguity is only in the phase, taking the magnitudes into account improves accuracy.

Interestingly, many constellation points configurations allow the establishing of candidates to be simplified considerably. For example, if the constellation points from which the information encoding symbols in the stream of information encoding symbols were selected from an M-PSK modulation scheme, the multiple channel offset estimate candidates may be established by computing the M'th complex power of the first received signal. The M-th power from of a constellation point in an M-PSK modulation scheme is constant, although for some modulation schemes the constant may depend on the symbol index. The M-th power is either always 1, or alternatively 1 and −1 depending on symbol index, e.g., for the DAB standard. By comparing the M'th complex power of a received signal with the M-th power of any possible constellation point, an ambiguous estimate is also obtained. The estimate is ambiguous since multiple estimates to the M-th power would result in the same number.

As noted, it is particularly advantageous, when taking averages to improve accuracy to establish the multiple channel frequency response estimate candidates from multiple received signals for multiple subcarriers of the OFMD symbol. All subcarriers were sent over the same channel. Although channel response may be different for different frequencies, this effect (e.g. fading effects) is much smaller than the overall channel frequency response's impact on reception.

A further aspect of the invention concerns a demodulator device comprising a channel frequency response estimator, wherein the stream of information encoding symbols are encoded in the wireless RF signal by differential modulation, the demodulator device comprising a demodulator configured for coherent demodulation of the first stream of received signals using the channel frequency response.

Interestingly, although differential modulation was designed to obviate the need to obtain a channel response estimate, one may nevertheless improve reception by coherently demodulate a differential modulation before obtaining the information contained in the differences between received signals. This improves reception in two ways; first it reduces noise since channel compensation may be done for two signals, before subtraction; second it improves subsequent decoding since more accurate soft decision information is available. Coherent demodulation is especially advantageous when the channel frequency response is likely to so show relatively large changes, i.e., when moving receivers are involved; that is the two signals of a differentially encoded information item may be distorted by different channel responses. Such coherent demodulation improves reception markedly, provided that channel frequency response is estimated with sufficient precision, e.g., using the method explained herein.

The channel frequency response estimator and the demodulator device are electronic devices, in particular they be embodied in a mobile electronic device, e.g., a mobile phone, mobile computer, etc.

A method according to the invention may be implemented on a computer as a computer implemented method, or in dedicated hardware, or in a combination of both. Executable code for a method according to the invention may be stored on a computer program product. Examples of computer program products include memory devices, optical storage devices, integrated circuits, servers, online software, etc. Preferably, the computer program product comprises non-transitory program code means stored on a computer readable medium for performing a method according to the invention when said program product is executed on a computer In a preferred embodiment, the computer program comprises computer program code means adapted to perform all the steps of a method according to the invention when the computer program is run on a computer. Preferably, the computer program is embodied on a computer readable medium.

BRIEF DESCRIPTION OF THE DRAWINGS

These and other aspects of the invention are apparent from and will be elucidated with reference to the embodiments described hereinafter. In the drawings.

It should be noted that items which have the same reference numbers in different Figures, have the same structural features and the same functions, or are the same signals. Where the function and/or structure of such an item has been explained, there is no necessity for repeated explanation thereof in the detailed description.

LIST OF REFERENCE NUMERALS 100 a demodulator device
110 a wireless receiver
120 a channel frequency response estimator
130 an ambiguous channel frequency response estimator
132 a channel magnitude estimator
134 a channel offset estimator
140 an ambiguity resolver
142 a goodness of fit determiner
150 a coherent demodulator
160 an error corrector
162 an interleaver
1, 1', 1", 1''' channel frequency response estimates candidates
2, 2', 2", 2''' channel frequency response estimates candidates
3, 3', 3", 3''' channel frequency response estimates candidates

DETAILED EMBODIMENTS

While this invention is susceptible of embodiment in many different forms, there is shown in the drawings and will herein be described in detail one or more specific embodiments, with the understanding that the present disclosure is to be considered as exemplary of the principles of the invention and not intended to limit the invention to the specific embodiments shown and described.

Figure 1:
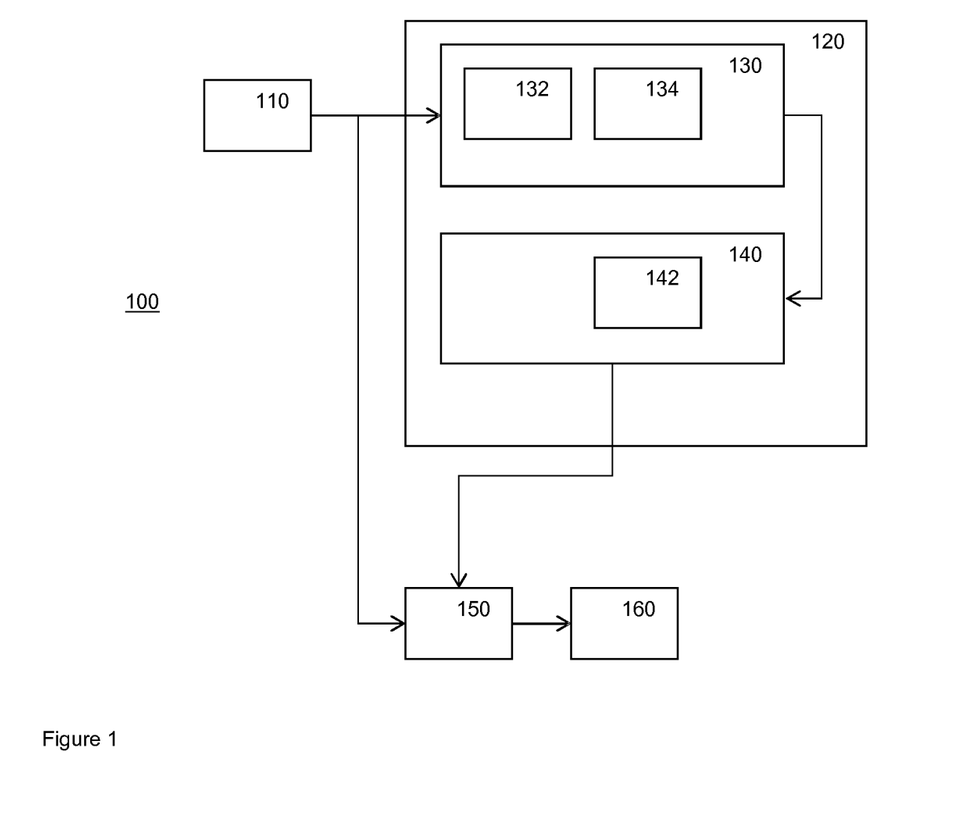
FIG. 1 shows in schematic form a demodulator device 100.

FIG. 1 shows in schematic form a demodulator device 100. Demodulator 100 comprises a wireless receiver 110, a channel frequency response estimator 120, a coherent demodulator 150 and an error corrector 160. Demodulator device 100 is configured to received and demodulate wireless RF signals that were sent by a transmitter (not shown). At the transmitter information, i.e., digital information, is mapped into a stream of information encoding symbols, by selecting the information encoding symbols from a pre-determined set of constellation points. The selection is determined at least by the information. A constellation point represents a phase change of a carrier symbol, and possibly also a magnitude change. The stream of information encoding symbols is encoded into a wireless RF signal by modulating at least the phase of a carrier signal. The modulated RF signal is transmitted over a wireless channel using an antenna. For example the RF signal may be a RF signal in the so-called L-band. Demodulator device 100 is configured to recover the stream of information encoding symbols. The modulation scheme may be a differential encoding scheme, in which the information is encoded in the difference between subsequent information encoding symbols or not.

We will mainly consider a differential modulated system, e.g. a D-MPSK modulation (differential modulation having M constellation point equispaced on the unit circle of a constellation diagram) such as DQPSK (4 constellation points). The symbols may be transmitted over multiple subcarriers, e.g., over parallel subcarriers of an OFDM symbol. An example of such a system is the DAB or DAB+ system. However the invention also applies to non-differential system in which pilot signals are transmitted among the information encoding symbols to calibrate. The invention also applies to other signaling schemes such as single carrier modulated, CDMA or any version of multi-carrier modulation etc. especially when differential modulation is used. However, the proposed methods also apply to other dimensions, e.g., when differential modulation is applied in frequency domain.

For example, the transmitter may receive information bits as input, and, in order apply: an FEC encoder, an interleaver, a differential modulator, a data mapper, IFFT & cyclic prefix inserter, a TX filter, a Digital to Analog convert and finally an antenna for transmission. In one embodiment, the data mapper converts the bits to complex numbers from a constellation.

Wireless receiver 110 is configure to receive the wireless RF signal and obtaining therefrom a stream of received signals corresponding to corresponding to the stream of information encoding symbols. The reception of digitally modulated signals is known per se. For example, the wireless receiver may comprise an RC filter, an Analog-to-Digital converter, a time and frequency synchronizer, a cyclic prefix remover, an FFT device, and a data extractor. The output of the wireless receiver, the received signals, may be represented by complex numbers.

Channel frequency response estimator produces an estimate of the channel frequency response as the time a received signal was transmitted. The Channel frequency response estimator tracks the channel. In case a modulation scheme without pilots is used, this is a so-called 'blind channel tracking'. Blind channel tracking may be used especially for differentially modulated signals (e.g. DMPSK). In case also pilot signals are sent the channel frequency response estimator tracks the evolution of the channel frequency response in between pilots. Especially for high mobility situations the frequency with which pilots are sent out may not be sufficient for proper tracking. Channel frequency response estimator may track the channel using partially, information encoding symbols, as in the blind case, and partially pilots. A channel frequency estimator has two components a channel magnitude and a channel phase offset.

The transmission and reception is represented in mathematical terms as follows: $y_{l,k} = H_{l,k} s_{l,l} + n_{l,k}$. The index k represents the subcarrier of an OFDM symbol, in case a single frequency symbol is used, the index k may b omitted. The index I represents the symbol number. y represents the received symbol, H the channel frequency response and s is the transmitted symbol. In case differential encoding is used, the transmitted symbol may be encoded as $s_{l+1,k} = s_{l,k} q_{l,k}$ in this case the information is represented by q and encoded in the differences of the information encoding symbols. The s are constellation points.

Once the channel parameters are estimated by the channel frequency response estimator, as will be further explained below, one can perform a two symbol coherent demodulation for differential modulated symbols instead of differential demodulation. In this case, each symbol's probability may be computed as $$P[s_l = e^{j\phi_l}] = P[n_l = y_l - \tilde{H}_l e^{j\phi_l}]$$
$$= \frac{1}{\pi \sigma_{noise}^2} e^{-\frac{|y_l - \tilde{H}_l e^{j\phi_l}|^2}{\sigma_{noise}^2}}$$

and similarly for l+1. An index k may be added to each index l to indicate the subcarrier.

For the DAB standard for the transmitted bits (0,0) the combined probability is given by:

$$P[(x_l^1, x_l^2 = (0, 0)] = \sum_{\phi_l} P[s_l = e^{j\phi_l}] \cdot P[s_{l+1} = e^{j\phi_l + \pi/4}]$$

Note that in DAB depending on the index the constellation set differs. For this reason the second symbol is shifted over π/4, in case a modulation is used without shift, such a shift may be omitted. Similar formulas may be drawn up for the other transmitted bits, by substituting the appropriate symbol combination that represents it. In the DAB formula above, the index for subcarrier has been omitted for clarity. The loglikelihood ratio of the transmitted bits may be obtained from all possibilities the symbol probabilities of l and l+1. The probabilities may also be expressed as log-max approximations.

The probabilities, optionally expressed as log-max approximations may be used as input for error corrector 160. For example, error corrector 160 may use a Viterbi decoder. Using the channel frequency response estimate a precise estimate for the probability that a particular value was transmitted may be given. If the channel frequency response changed in between successive received signals then this will improve reception. To listen to DAB or DAB+ radio with a mobile receiver, say in a car, this will improve reception quality. One may also use the same method in iterative decoding methods; hard or soft decision feedback is possible.

Channel frequency response estimator 120 comprises an ambiguous channel frequency response estimator 130 and an ambiguity resolver 140. Ambiguous channel frequency response estimator 130 established multiple candidates of what the channel frequency response could be. Ambiguous channel frequency response estimator 130 obtains the estimates by comparing received signals with the constellation points that they could correspond to. Since there are multiple constellation points and it is unknown which one was transmitted, ambiguous channel frequency response estimator 130 will produce multiple candidate estimates.

This ambiguity is then resolved by ambiguity resolver 140. Ambiguity resolver 140 takes a sequence of channel frequency responses for at least three symbol periods and determines which sequences resemble most a physically likely progression and which are physically unlikely. The three symbol periods preferably are subsequent, i.e., adjacent, in time. One or more of the further channel frequency response estimates of the sequence of channel frequency responses may correspond to a pilot signal. In this case there is no need to optimize over such a symbol, the ambiguity resolver only resolves the ambiguity if the corresponding information encoding symbol was actually selected from a set of constellation point, i.e., is unknown at the receiver. Having a pilot in the sequence has the consequence that there is probably an optimum of best fit. If there are no pilots then the same sequence shifted over 2 ρi/M will likely have the same goodness of fit. This means that there is probably no unique optimum. For a differential encoded system this is not a problem since all optima, would have the same phase differences.

Figure 3A:
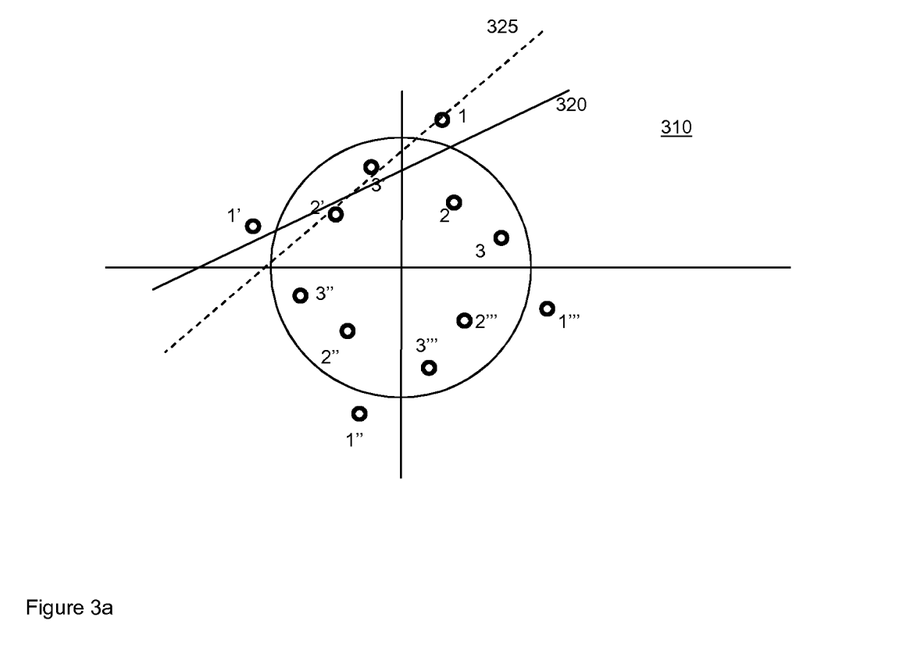
FIG. 3a shows three sets of channel frequency response estimate candidates.

FIG. 3a illustrates how ambiguity resolver 140 may work. The figure shows in a constellation diagram the channel frequency response estimates. The modulation scheme was D4-PSK, e.g. DQPSK. The numbers 1, 2 and 3 correspond to three subsequent symbol periods. Apostrophes indicate the different candidates. Note that this differential scheme, each frequency response has 4 possibilities corresponding to the four possible constellation points. Ambiguity resolver 140 assumes a linear channel model (other options are possible). The ambiguity is resolves by selecting a choice from among the candidates that fit closely to this model.

For example, one way to proceed is as follows. Consider all possible combinations of a choice of channel frequency response for each symbol period. In this situation that means 4*4*4=64 possibilities are considered. For each combination a goodness of fits is determined, or alternatively fitting error, which indicate how well these particular choices fit the model. It turns out, in FIG. 3a that selecting candidates 1, 2' and 3' is the best option. These three channel frequency responses fit very well to the linear model considering the order of the channel frequency responses. On the other hand, say, 1, 2' and 3''', fit very poorly. It is not very likely that the sequence 1, 2' and 3''' correspond to an actual sequence of channel frequency responses. Various optimizations are possible. For example, since this is a differential scheme only differences matter, so one of the points may be fixed, say point 1'.

Line 320 shows the best found linear progression. Note that in this case estimates 1", 2" and 3" give a linear progression that fits equally well. However, since differential modulation is used, the differences are the same, e.g. the difference between 1' and 2" equal that of 1 and 2'. If estimate 1' corresponded to a pilot than points 1, 1" and 1''' may be omitted. Note that in this case there is a unique optimum. The model used for FIG. 3a requires both that the estimates are collinear, and also that the estimates are equispaced. These requirements may be relaxed to simplify.

There is some freedom on which estimate to use. Estimates 1, 2 and 3 correspond to received signals 1, 2 and 3. The received signals 1, 2 and 3 were received in that order. Received signals 1 may be taken as the most recent of the three or as the oldest. Preferably, the received signals 1, 2 and 3 were received in three subsequent symbol periods. However, to take pilots into account one may opt to skip some none-pilot symbols. There is some freedom on which estimate to use for which demodulation. For example, one could use the estimate 1 for the received signal 1, and perform a new optimization on estimates 2, 3, and 4 to find an estimate for received signal 2. Alternatively, one may put the estimate to use in the middle, i.e., use estimate 2 instead of 1. One may also reduce the number of optimization and use multiple estimates from one channel fitting optimization.

Interestingly, the order of the estimates is important. Line 325, fitted to points 1, 2' and 3' may appear to give a better fit, however in reality the fit is rather poor. The reason is that the difference between 1 and 2' differs a lot from the difference between 2' and 3'. However, for points 1', 2' and 3', the difference between 1' and 2' is about equal to the difference between 2' and 3'. To put this in other words, estimates 1', 2' and 3' in that order, have a better goodness of fit with the linear model than points 1, 2' and 3'.

FIG. 3a may also be seen to illustrate fitting to a model of frequency dependency. In this case, the order of the estimates does not correspond to time-order but to the frequency-order.

Figure 3B:
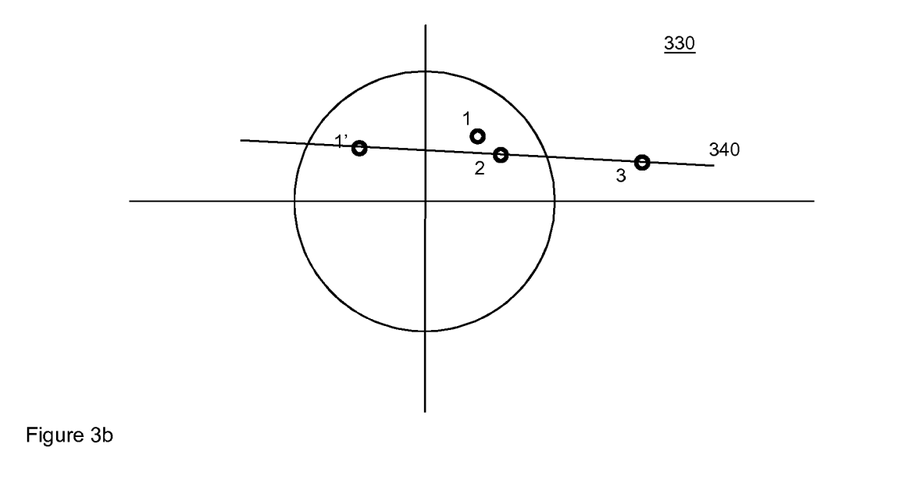
FIG. 3b shows channel frequency response estimates.

FIG. 3b shows a diagram 330. It illustrates that a model which takes three channel frequency responses is superior to one that takes two channel frequency responses into account. For example, with two channel frequency responses one could formulate the rule to take the candidate that is closest to the previous channel frequency responses. Given point 2, and candidates 1 and 1', this rule would select candidate 1. However, if also point 3 is taken into account, it appears that 1' is a better candidate. The channel frequency response was changing rapidly in the past, and it appears that this change will continue. FIG. 3b shows that using the simpler rule will result in occasional bad demodulation when using a mobile receiver. This adds to the already high noise pressure. Using the improved system, changes in channel frequency response may be taken into account.

Ambiguity resolver 140 comprises a goodness of fit determiner 142 which given a number of channel frequency response estimates produces an indication how they fit to a channel model. 'Goodness of fit' is per se known from statistical model theory. The goodness of fit of a statistical model describes how well a set of observations fits the model. Measures of goodness of fit typically summarize the discrepancy between observed values and the values expected under the model in question. Of course a goodness of fit may be expressed positively or negatively, in the latter case, this is referred to as a fitting error.

Typically, a channel model comprises parameters; the number of parameters being less than the number of channel frequency response estimates. Fitting may comprise choosing values for the parameters such that the model reproduces the channel frequency response estimates as closely as possible. In case of a linear model, the parameter may be one channel frequency response value and channel frequency response delta, which indicates how much channel frequency response changes each symbol period.

Ambiguity resolver 140 is further explained by means of a worked example. In differential modulation, the data is not in the phase information but in the difference of the phases of modulated symbols, and any common phase offset of 2π/M will not affect the demodulation of M-DPSK adversely. We are most interested in estimating channel changes in mobile reception. The variation of the channel in mobile reception is a continuous process, i.e., channel changes smoothly over time. There are several different techniques to model the variations in the channel. One convenient channel model uses Taylor series approximation, see e.g. 'Robust OFDM receivers for dispersive timevarying channels: Equalization and channel acquisition' by Alexei Gorokhov, and Jean-paul Linnartz. Using a finite power series expansion for the time-varying frequency response, may be expressed as follows:

$$H_{l'} \approx H_l + H'_l(l'-l)T + \tfrac{1}{2}H''_l(l'-l)^2 T^2 + \ldots$$

In this equation T represents the symbol period, l' is the symbol that is predicted from symbols in its vicinity. If OFDM symbols are used, a second subscript k may be added to indicate the subcarrier, alternatively the response for different subcarriers may be assumed equal. For low to medium levels of mobility, 1st order Taylor series approximation of the channel is quite accurate. Thus, we may assume that channel varies as $$H_{l'} \approx H_l + H'_l(l'-l)T$$

Assuming first order Taylor series approximation over 3 symbols, we expect channel to change as:

$$\begin{bmatrix} H_{l-1} \\ H_l \\ H_{l+1} \end{bmatrix} \approx \begin{bmatrix} 1 & -1 \\ 1 & 0 \\ 1 & 1 \end{bmatrix} \begin{bmatrix} H_l \\ H'_l T \end{bmatrix}$$

The modeling error will have the weights of the entries of a vector orthogonal to [1,1,1] and [−1, 0,1], i.e., [1, −2,1], Thus, we propose to use a cost function of $$f(\hat{H}_{l-1}, \hat{H}_l, \hat{H}_{l+1}) = |\hat{H}_{l-1} - 2\hat{H}_l + \hat{H}_{l+1}|^2$$

for the fitting error of the time variation of the channel when 1st order Taylor series approximation is used (the ^accent indicates an estimate). One may devise different channel modelling and cost functions for the modelling errors. Taylor series modelling is an efficient choice since it only needs absolute squared value of weighted sum of the estimated channel gains. One may also reduce the complexity by reducing the cost function into a simpler form which only compares different phase ambiguities.

Assume that for 3 symbols, we have estimates of channel magnitudes, and their phase estimates. The phase estimates may have been obtained by filtering or averaging over the Mth powers, of the received signals. Since we are here interested only in phase changes from one OFDM symbol to the next one, but not the absolute phases, we assume that there is no phase ambiguity in the l'th symbol but others may have; leading to 4×4=16 possible channel values for a subset of subcarriers of 3 OFDM symbols.

Over all possible phase ambiguity cases, we can find the best candidate fitting to the channel variation model we use by finding the best pair minimizing our channel modelling error cost function. After finding the best pair, the channel gain information may be used in coherent demodulation of differential modulated symbols.

An alternative approach to make the decisions in solving the phase ambiguities is using a larger number of successive symbols and/or using different channel modelling and corresponding channel modelling error cost functions. One can simply extend the 3 (OFDM) symbol cost function into a more robust one by using a larger number of symbols, e.g., 5 symbols.

Increasing the number of symbols and/or using a better channel variation modelling will lead to more accurate decisions on phase ambiguities. Notice that a cost function with 5 estimates needs to compare $4^4$=256 possible phase ambiguities. However, one may devise more ad-hoc approaches for better complexity performance tradeoffs.

Ambiguous channel frequency response estimator 130 may estimate the magnitude and the phase offset part of the channel frequency response separately. The figure shows such an embodiment having a channel magnitude estimator 132 and a channel offset estimator 134.

The two important parameters of the channel, are, 1-channel magnitude and 2-channel phase offset with respect to constellation points to apply coherent demodulation schemes to differential modulation. The channel magnitude can be estimated by averaging the magnitudes of the received signals. Averaging over a large observation set provides an accurate estimation of the channel magnitude. Furthermore, M-DPSK modulation is a constant modulus modulation, thus, it does not affect the received signals magnitude, and provides better accuracy. In case of other differential modulation methods with non-constant, modulus or QAM modulation schemes, one may use a larger observation set to filter or average the received signal magnitudes to reduce the effect of different magnitudes in the constellation points.

Using the property of constant amplitude in M-DPSK modulation and correlated channels, the channel magnitude can be estimated. In a first option, the channel magnitude is estimated by averaging over a subset of subcarriers as $$|\hat{H}_l| = \max\left(\sqrt{\frac{\sum_l |y_l|^2}{N_{samples}} - \sigma_{noise}^2}, 0\right)$$

The $N_{samples}$ may be chosen in both time and frequency domains depending on the expected or estimated frequency selectivity or time selectivity due to mobility Since we aim to increase robustness against mobility and channel is expected to change over time, it is recommended to average over a single OFDM symbol or only a few OFDM symbols, say two or three. Note again that the system may also be applied to single-frequency, i.e. non-OFDM, modulation; in this case the estimate may be based on a single sample, or sample from multiple received signals.

Other estimations of the channel magnitude are possible. In a second option, for example, one may take the magnitude of a single received signal as an estimate for the channel magnitude. This ignores channel noise, so such an estimate is not advisable for higher noise channels. Estimates may also be combined, for example, although the above first option is in general more accurate estimate, in rare circumstance, i.e., when receiving very low magnitude signals on a high noise channel, the quantity under the root sign may be negative, in which case the value 0 is used. In that case, one may also temporarily switch to using the magnitude of a received signal as estimate. Once the channel has restored to more acceptable levels, e.g., once the received signals have higher magnitudes than the noise, one may revert to the more accurate estimate.

Channel offset estimator 134 of ambiguous channel frequency response estimator 130 estimates the channel phase offset component of the channel frequency response. Many modulation schemes, especially those using differential modulation do not provide pilot or training sequence. Even coherent modulation schemes often do not provide pilots for every symbol, note even for every OFDM symbol. For example, in the DAB family of standards there are no pilot or training sequences, so one cannot estimate any channel related information coherently, but only blindly.

One may obtain phase offset information by comparing received signals with every possible symbol that could have been sent, i.e., with every possible constellation point used in the modulation scheme. However, for M-DPSK modulation a simpler approach is possible. An interesting observation for M-DPSK modulation is that the M-th power of the transmitted symbol, i.e., $s_l^M = e^{jM\Phi l}$, has some fixed value regardless of the data sent. In DAB standard, $s_{l,k}^4$ is either 1 or −1 depending on the index of the OFDM symbol which is known at both transmitter and receiver side.

Note, when OFDM symbols are used, such as DAB, the added index k indicates the subcarrier for the OFDM symbol; in general, formulas for single frequency schemes are adapted to OFDM schemes, by adding an index for the subcarrier. Thus, the received signal's M'th power may be used as virtual pilots to estimate the required parameters of the channel, i.e., in this case channel phase offset. For the specific case of DAB and DQPSK modulation, we may to take the 4-th power of the received signals as $$y_{l,k}^4 = (H_{l,k} s_{l,k} + n_{l,k})^4$$
$$= |H_{l,k}^4| \exp(j \cdot 4 \cdot \text{Phase}(H_{l,k})) p_{l,k} + \zeta_{l,k}$$

where $p_{l,k}$ is the virtual pilot, value, e.g., 1 or −1 in DAB depending on OFDM symbol index, and $\zeta_{l,k}$ is the zero mean distortion factor due to additive white Gaussian noise (AWGN). One can choose to filter the $\{y_{l,k}^4\}$ values in the time and/or frequency domain to obtain a better estimate of the exp ($j \cdot 4 \cdot$Phase($H_{l,k}$)) thus exploiting correlation in time and/or frequency. For example, one may average multiple $\{y_{l,k}^4\}$ values over multiple symbol periods (i.e. different values of l), preferably subsequent values, and/or for one may average over multiple subcarrier frequencies (i.e. different values of k).

Since we are concerned most about mobility and the channel is expected to change over time, it is recommended to average over a single OFDM symbol or only over a few OFDM symbols, say 2 or 3. A simple implementation can be averaging these values over a set of subcarriers for each OFDM symbol and estimating the phase offset, value as $$\theta_{H_{l,k}} = \frac{1}{M} \text{Phase}\left(\sum_{k} y_{l,k}^{M} p_{l,k}^{*}\right)$$

wherein, for an DQPSK system, in particular DAB, M would be 4. However, taking the power of M will introduce a phase ambiguity of $2\pi/M$ in an M-DPSK modulation, i.e., in high SNR, the actual phase may be $$\theta_{H_{l,k}} + m \cdot \frac{2\pi}{M}$$

for 0<=m<=(M−1). In other words there is an ambiguity and multiple candidate estimates are established. (Note that even though at high SNR, the estimate is very reliable it is still shifted.) If the channel frequency response changes little over time, then it would not matter if the channel phases offsets have an incorrect m. However if the value of m changes between symbols than the phase estimation in successive symbols can lead to significant, performance degradation.

In fixed reception, this problem can be alleviated by using a single phase estimation for successive OFDM symbols. In this case, since phase is expected to be the same in successive OFDM symbols and phase error is the same for successive symbols, it does not affect the estimation of the differential modulated data. However, this approach cannot be used for mobile channels. Since the phase of the channels can change, and using a single phase estimation over successive OFDM symbols will not give enough channel estimation accuracy to be used in coherent demodulation. Thus, one needs to solve this channel phase ambiguity problem. This is done by the ambiguity resolver which takes the multiple candidate estimates and determines, which one or ones of the candidates most closely follows a channel model. Thus a sequence of channel frequency responses which is not likely to correspond to a physical reality is eliminated.

If the modulation scheme does have pilots then the ambiguity needs only to be resolved for non-pilot symbols.

Typically, the channel frequency estimator comprises a microprocessor (not shown) which executes appropriate software stored at the device, e.g. that the software may have been downloaded and stored in a corresponding memory, e.g. a non-volatile memory such as flash memory (not shown).

Figure 2:
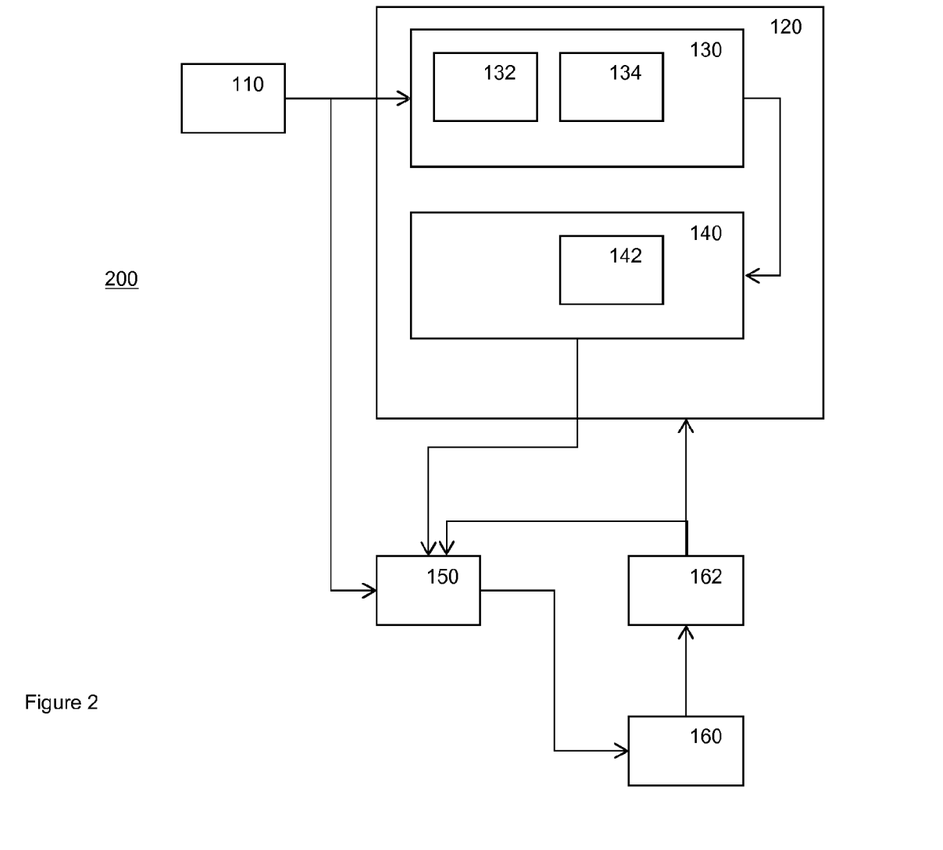
FIG. 2 shows in schematic form a demodulator device 200.

FIG. 2 shows demodulator device 200. Demodulator device 200 is the same as demodulator device 100 except as explained below. Demodulator device 200 uses an iterative decoding method. The error corrected received signals produced by error corrector 160 are interleaved again by interleaver 162. This in turn allows better estimations of the channel frequency response and thus better decoding of the received signals. In turn the improved demodulated received signals are error corrected again.

In a further embodiment, the channel frequency response estimator may comprise a mobility determiner configured to determine if the receiver is static or moving. For example the mobility determiner may determine mobility if the channel frequency response estimates obtained by the channel frequency response estimator change more than a first mobility threshold. For example, the mobility determiner may comprise or be connected to a speedometer, e.g. a speedometer and determine mobility if the reported speed is above a second mobility threshold. If the mobility determiner detects mobility, the channel frequency response estimator may continue to use the channel model as described above to determine channel frequency response estimates. If the mobility determiner detects a static or slow receiver, the channel frequency response estimator may switch to a different ambiguity resolver. For example, the ambiguity resolver may select channel frequency response estimates that are close together.

Figure 4:
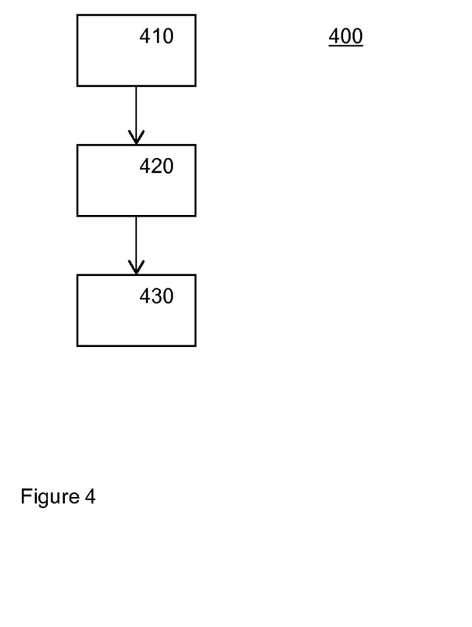
FIG. 4 shows a flowchart illustrating a method of channel frequency response estimation.

FIG. 4 illustrates in flow chart a method 400 for estimating the channel frequency response of a wireless RF channel having a time-varying channel frequency response. Step 410 comprises receiving a wireless RF signal and obtaining therefrom a stream of received signals corresponding to a stream of information encoding symbols, the stream of information encoding symbols being encoded into the wireless RF signal by modulating at least the phase of a carrier signal. Step 420 comprises establishing, from at least a first received signal of the stream of received signals, multiple channel frequency response estimate candidates for the channel frequency response of the channel during the transmission of the first received signal over the channel. Step 430 comprises selecting a channel frequency response estimate from the multiple channel frequency response estimate candidates that maximizes a goodness of fit of the selected first channel frequency response estimate, and at least two further channel frequency response estimates to a channel model, the channel model modeling the time-dependent variance of the channel frequency response, the at least two further channel frequency response estimates being estimates for the channel frequency response of the channel during transmission of at least two further received signals of the stream of received signals adjacent in time to the first received signal.

The channel frequency response estimate selected in step 430 may be used in a coherent demodulation of the received wireless signal.

Many different ways of executing the method are possible, as will be apparent to a person skilled in the art. For example, the order of the steps can be varied or some steps may be executed in parallel. Moreover, in between steps other method steps may be inserted. The inserted steps may represent refinements of the method such as described herein, or may be unrelated to the method. For example, steps 420 and 430 may be executed, at least partially, in parallel. Moreover, a given step may not have finished completely before a next step is started.

A method according to the invention may be executed using software, which comprises instructions for causing a processor system to perform method 400. Software may only include those steps taken by a particular sub-entity of the system. The software may be stored in a suitable storage medium, such as a hard disk, a floppy, a memory etc. The software may be sent as a signal along a wire, or wireless, or using a data network, e.g., the Internet. The software may be made available for download and/or for remote usage on a server.

For example, in a system to transfer digital information, such a voice, image or other data, through a wireless channel from a transmitter to a receiver may work in practice as follows. The digital information is encoded into a wireless RF signal by modulating at least the phase of a carrier signal. For example, the digital information is encoded in a stream of symbols selected from a set of constellation points, each constellation point representing a magnitude and phase, the carrier signal is modulated in accordance with the stream of symbols. The wireless RF signal is transmitted over a wireless channel. A wireless signal receiver may be configured to receive the wireless RF signal and obtaining therefrom a stream of received signals corresponding to the stream of information encoding symbols, each received signal of the stream of received signals having a phase and a magnitude. The stream of received signals carries the information. The wireless channel has a channel frequency response that may be time-varying, the channel frequency response comprising a channel magnitude and a channel phase offset. The phase offset is between a transmitted constellation point and a received constellation point. The channel frequency response is estimated from the stream of received signals. The channel magnitude is estimated from the magnitude of at least one received signal. For example, this may comprise computing the magnitude of the received constellation point and deriving an estimate of the channel magnitude from the magnitude of the received constellation point. The channel phase offset is estimated from the received information encoding constellation points. For example, this may comprise deriving a list of possible channel phase offset estimates and comparing the phase of the received signal with the phases of the constellation points. For example: one may compute a function of the received information encoding constellation point, such that the function applied to constellation points gives a fixed value. In other words one may derive a virtual pilot, a signal with would have a known value if the channel has an idealized channel response frequency of '1'. Further one may derive a list of possible channel frequency response estimates by combining the channel magnitude estimate with each of the list of possible channel phase offset estimates, deriving a first list of possible channel frequency response estimates for a first received signal and obtaining a channel frequency response estimates for at least a second and third received signal. The first, second and third channel frequency response estimates are preferably adjacent, though not necessarily in that order. For example, the second and third estimates may correspond to pilots, whereas the first corresponds to an information carrying signal corresponding to a constellation point selected in dependence on the information which is to be transmitted. Finally, one may select a channel frequency response from the first list that minimizes a fitting error representing the distance between the first, second and third channel frequency responses and a channel model modeling the time-dependent variance of the channel frequency response fitted to the first, second and third channel frequency responses.

It will be appreciated that the invention also extends to computer programs, particularly computer programs on or in a carrier, adapted for putting the invention into practice. The program may be in the form of source code, object code, a code intermediate source and object code such as partially compiled form, or in any other form suitable for use in the implementation of the method according to the invention. An embodiment relating to a computer program product comprises computer executable instructions corresponding to each of the processing steps of at least one of the methods set forth. These instructions may be subdivided into subroutines and/or be stored in one or more files that may be linked statically or dynamically. Another embodiment relating to a computer program product comprises computer executable instructions corresponding to each of the means of at least one of the systems and/or products set forth.

It should be noted that the above-mentioned embodiments illustrate rather than limit the invention, and that those skilled in the art will be able to design many alternative embodiments.

In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. A channel frequency response estimator for estimating the channel frequency response of a wireless RF channel having a time or frequency-varying channel frequency response, the channel frequency response estimator comprising:
a wireless receiver configured to receive a wireless RF signal and obtaining therefrom a stream of received signals corresponding to a stream of information encoding symbols, the stream of information encoding symbols being encoded into the wireless RF signal by modulating at least the phase of a carrier signal,
an ambiguous channel frequency response estimator configured to establish, for each of at least a first received signal of the stream of received signals and two further received signals adjacent in time to the first received signal, multiple channel frequency response estimate candidates for the channel frequency response of the channel during transmission of the first and two further received signals over the channel and wherein each of the channel frequency response estimate candidates is determined from a respective set of constellation points of selected symbols for the first and two further received signals,
an ambiguity resolver configured to select a channel frequency response estimate from the multiple channel frequency response estimate candidates for one of the first and two further received signals that maximizes a goodness of fit of the selected channel frequency response estimate and respective multiple channel frequency response estimates of the other of the first and two further received signals to a channel model, the channel model modeling a time or frequency-dependent variance of the channel frequency response.

2. The channel frequency response estimator as in claim 1, wherein
the ambiguous channel frequency response estimator is configured to establish at least two further multiple channel frequency response estimate candidates for the channel frequency response of the channel during the transmission of the at least two further channel frequency response estimates respectively,
the ambiguity resolver is configured to select a channel frequency response estimate from the multiple channel frequency response estimate candidates and the at least two further multiple channel frequency response estimate candidates, that maximizes the goodness of fit of the selected channel frequency response estimates to the channel model.

3. The channel frequency response estimator as in claim 1, wherein at least one of the at least two further received signals correspond to transmitted pilot signals.

4. The channel frequency response estimator as in claim 1, wherein the channel model is a linear model.

5. The channel frequency response estimator as in claim 1, wherein the goodness of fit is maximized if a fitting error function is minimized, wherein the fitting error function represents $|\hat{H}_1 - 2\hat{H}_{-1}|^2$, wherein $\hat{H}_1$, $\hat{H}_0$, $\hat{H}_{-1}$ represent the selected first channel frequency response estimate, and the at least two further channel frequency response estimates, respectively.

6. The channel frequency response estimator as in claim 1, wherein the establishing multiple channel frequency response estimate candidates from at least the first received signal comprises establishing a channel magnitude estimate from at least the magnitude of the first received signal, and establishing multiple channel offset estimate candidates by comparing the phase of the first received signal with the phases of the constellation points from which the information encoding symbols in the stream of information encoding symbols were selected.

7. The channel frequency response estimator as in claim 6, wherein constellation points from which the information encoding symbols in the stream of information encoding symbols were selected correspond to an M-PSK modulation scheme, the multiple channel offset estimate candidates are established by computing an M'th complex power of the first received signal, where M is an integer.

8. The channel frequency response estimator as in claim 1, wherein the first received signal is received as one subcarrier of multiple subcarriers of an OFDM symbol, the ambiguous channel frequency response estimator being configured to establish the multiple channel frequency response estimate candidates from received signals for multiple subcarriers of the OFDM symbol.

9. The channel frequency response estimator as in claim 1, comprising a mobility determiner configured to determine if the wireless receiver is static or moving, a further ambiguity resolver configured to select a channel frequency response estimate from the multiple channel frequency response estimate candidates that is closest to a further channel frequency response estimate, wherein the channel frequency response estimator is configured to use the ambiguity resolver if the mobility determiner determined that the wireless receiver is moving and to use the further ambiguity resolver if the mobility determiner determined that the wireless receiver is static.

10. A demodulator device comprising the channel frequency response estimator as in claim 1, wherein the stream of information encoding symbols are encoded in the wireless RF signal by differential modulation, the demodulator device comprising a demodulator configured for coherent demodulation of the stream of received signals using the channel frequency response.

11. A method for estimating a channel frequency response of a wireless RF channel having a time or frequency-varying channel frequency response, the method comprising:

receiving a wireless RF signal and obtaining therefrom a stream of received signals corresponding to a stream of information encoding symbols, the stream of information encoding symbols being encoded into the wireless RF signal by modulating at least the phase of a carrier signal, establishing, for each of at least a first received signal of the stream of received signals and two further received signals adjacent in time to the first received signal, multiple channel frequency response estimate candidates for the channel frequency response of the channel during transmission of the first and two further received signals over the channel by selecting information encoding symbols from different sets of constellation points respective to each of the first and two further received signals, selecting a channel frequency response estimate from the multiple channel frequency response estimate candidates for one of the first and two further received signals that maximizes a goodness of fit of the selected channel frequency response estimate, and respective multiple channel frequency response estimates for the first and two further received signals to a channel model, the channel model modeling time dependent variance of the channel frequency response.

12. A non-transitory computer readable medium having computer executable instructions stored thereon for estimating a channel frequency response of a wireless RF channel having a time or frequency-varying channel frequency response, the computer executable instructions, when executed, performing a method comprising:

obtaining code for obtaining from a received wireless RF signal a stream of received signals corresponding to a stream of information encoding symbols, the stream of information encoding symbols being encoded into the wireless RF signal by modulating at least the phase of a carrier signal, establishing code for establishing, for each of at least a first received signal of the stream of received signals and two further received signals adjacent in time to the first received signal, multiple channel frequency response estimate candidates for the channel frequency response of the channel during transmission of the received signals over the channel and wherein each of the channel frequency response estimate candidates is determined from a respective set of constellation points of selected symbols for the received signals, selecting code for selecting a channel frequency response estimate from the multiple channel frequency response estimate candidates for one of the received signals that maximizes a goodness of fit of the selected channel frequency response estimate, and respective multiple channel frequency response estimates for the two further received signals to a channel model, the channel model modeling time-dependent variance of the channel frequency response.

* * * * *